US007886313B2

(12) United States Patent
Lu

(10) Patent No.: US 7,886,313 B2
(45) Date of Patent: Feb. 8, 2011

(54) OPTICAL DISC DRIVE

(75) Inventor: Kuo-Ping Lu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 553 days.

(21) Appl. No.: 12/023,039

(22) Filed: Jan. 31, 2008

(65) Prior Publication Data

US 2008/0196049 A1 Aug. 14, 2008

(30) Foreign Application Priority Data

Feb. 9, 2007 (TW) .............................. 96104766 A

(51) Int. Cl.
*G11B 17/03* (2006.01)
(52) U.S. Cl. ..................................... 720/604
(58) Field of Classification Search ................. 720/623, 720/707, 702, 614, 709, 713, 712, 605, 715, 720/624, 675, 620, 700, 609, 672, 697, 604, 720/601, 602, 603, 600, 606
See application file for complete search history.

(56) References Cited

U.S. PATENT DOCUMENTS

2005/0270915 A1* 12/2005 Omori et al. ............. 369/44.14
2008/0301723 A1* 12/2008 Eguchi ....................... 720/620
2010/0138846 A1* 6/2010 Fujisawa .................... 720/620

FOREIGN PATENT DOCUMENTS

JP 2002-245697 8/2002

OTHER PUBLICATIONS

"Office Action of China counterpart application", issued on Jun. 12, 2009, p. 1-p. 4.

* cited by examiner

*Primary Examiner*—Allen T Cao
(74) *Attorney, Agent, or Firm*—Jianq Chyun IP Office

(57) ABSTRACT

An optical disc drive is suitable to read data of an optical disc. The optical disc drive includes a housing, a turntable and an ejecting mechanism. The turntable has a chuck claw holds at an opening of the optical disc. The ejecting mechanism includes a button, a reposition assembly and at least an ejecting assembly. The button is configured at the turntable and has an operating portion and a connecting portion. The reposition assembly is adjacent to the button and provides the button with a return force along a first direction. Moreover, the ejecting assembly has a first portion connected to the connecting portion, a second portion connected to the turntable and a third portion protruding out the turntable. When the operating portion is forced and moves along a second direction, the connecting portion drives the third portion to move along the first direction and push the optical disc.

10 Claims, 7 Drawing Sheets

OPTICAL DISC DRIVE

CROSS-REFERENCE TO RELATED APPLICATION

This application claims the priority benefit of Taiwan application serial no. 96104766, filed on Feb. 9, 2007. The entirety of the above-mentioned patent application is hereby incorporated by reference herein and made a part of this specification.

BACKGROUND OF THE INVENTION

1. Field of the Invention

The invention relates to an optical disc drive and, more particularly, to an optical disc drive having an ejecting mechanism.

2. Description of the Related Art

An optical disc has many advantages such as low price, convenient to carry, large storage capacity, easy to store, long storage life, low cost, uneasily to destroy data, and so on. Therefore, the optical disc has gradually replaced the conventional magnetic storage medium and becomes an essential optical storage medium of modern people nowadays. Since the optical disc has been used widely, the optical disc drive for reading data of the optical disc has also been common electronic products in our life.

FIG. 1A is a three-dimensional schematic diagram showing a conventional optical disc drive and an optical disc. FIG. 1B is a schematic diagram showing the optical disc shown in FIG. 1A held at the turntable of the optical disc drive. Please refer to FIG. 1A and FIG. 1B. The conventional optical disc drive 100 includes a housing 110, a turntable 120, a pickup 130 and a tray 140, wherein the turntable 120 and the pickup 130 are configured on the tray 140, and the tray 140 is sliding provided at the housing 110. When a user uses the optical disc drive 100 to read data of the optical disc 10, he can put the optical disc 10 on the tray 140 first, and fix the optical disc 10 on the turntable 120 by the chuck claw 122 of the turntable 120. Then, operated by the user, the tray 140 which carries the optical disc 10 can slide into the housing 100 via the a sliding track (which is not shown), and the pickup 130 can read the data of the optical disc 10.

When the user makes the tray 140 eject from the housing 110 and takes off the optical disc 10 from the turntable 120, since the optical disc 10 is held by the chuck claw 122, the user should force on the optical disc 10 to make the optical disc 10 get rid of the holding of the chuck claw 122. However, when the user takes off the optical disc 10, the optical disc 10 is easily destroyed by improper force, so that the data stored in the optical disc 10 cannot be read.

BRIEF SUMMARY OF THE INVENTION

One objective of the invention is to provide an optical disc drive to solve the problem that when an optical disc is taken off from an optical disc drive, improper force of the user will destroy the optical disc.

To achieve the above or other objectives, the invention provides an optical disc drive which is suitable to read data of an optical disc having a first opening. The optical disc drive of the invention includes a housing, a turntable and an ejecting mechanism configured at the turntable, wherein the turntable is configured in the housing and has a chuck claw which is suitable to hold at the first opening. In addition, the ejecting mechanism includes a button, a reposition assembly and at least an ejecting assembly. The button is configured at the turntable and has an operating portion and a connecting portion. The reposition assembly is adjacent to the button and provides the button with a return force along a first direction. Moreover, the ejecting assembly has a first portion pivotally connected to the connecting portion, a second portion pivotally connected to the turntable and a third portion protruding out the turntable. When the operating portion is forced and moves along a second direction, the connecting portion drives the third portion to move along the first direction and push the optical disc.

In one embodiment of the invention, the optical disc drive further includes a tray which is configured in the housing and suitable to eject from the housing, and the turntable is configured at the tray.

In one embodiment of the invention, the optical disc drive further includes at least a first pivot and a second pivot. The first pivot disposes between the ejecting assembly and the connecting part of the button, and the second pivot passes through at lease a part of the turntable and the ejecting assembly.

In one embodiment of the invention, the reposition assembly is a spring.

In one embodiment of the invention, the turntable further includes a second opening and a base which covers the second opening, and the reposition assembly is configured between the button and the base.

In one embodiment of the invention, the optical disc drive further includes a driving assembly for turning the turntable.

In one embodiment of the invention, one side of the turntable further includes at least a third opening, and the third portion of the ejecting assembly passes through the third opening.

In one embodiment of the invention, the ejecting assembly is wave-shaped, and the second portion is between the first portion and the third portion.

In one embodiment of the invention, the optical disc drive is a slim optical disc drive which is suitable to be used in a notebook.

In one embodiment of the invention, the button protrudes from one side of the turntable. When the button is pressed down, the button moves toward the second direction, and when the button is pushed upward by the reposition assembly, the button moves toward the first direction.

In the invention, an ejecting mechanism is configured on the turntable of the optical disc drive. The ejecting mechanism can exert an upward force on the optical disc held on the turntable, so that the optical disc can get rid of the holding of the chuck claw, and the user can take off the optical disc from the turntable swimmingly.

These and other features, aspects, and advantages of the present invention will become better understood with regard to the following description, appended claims, and accompanying drawings.

DETAILED DESCRIPTION OF THE EMBODIMENTS

Figure 1A:
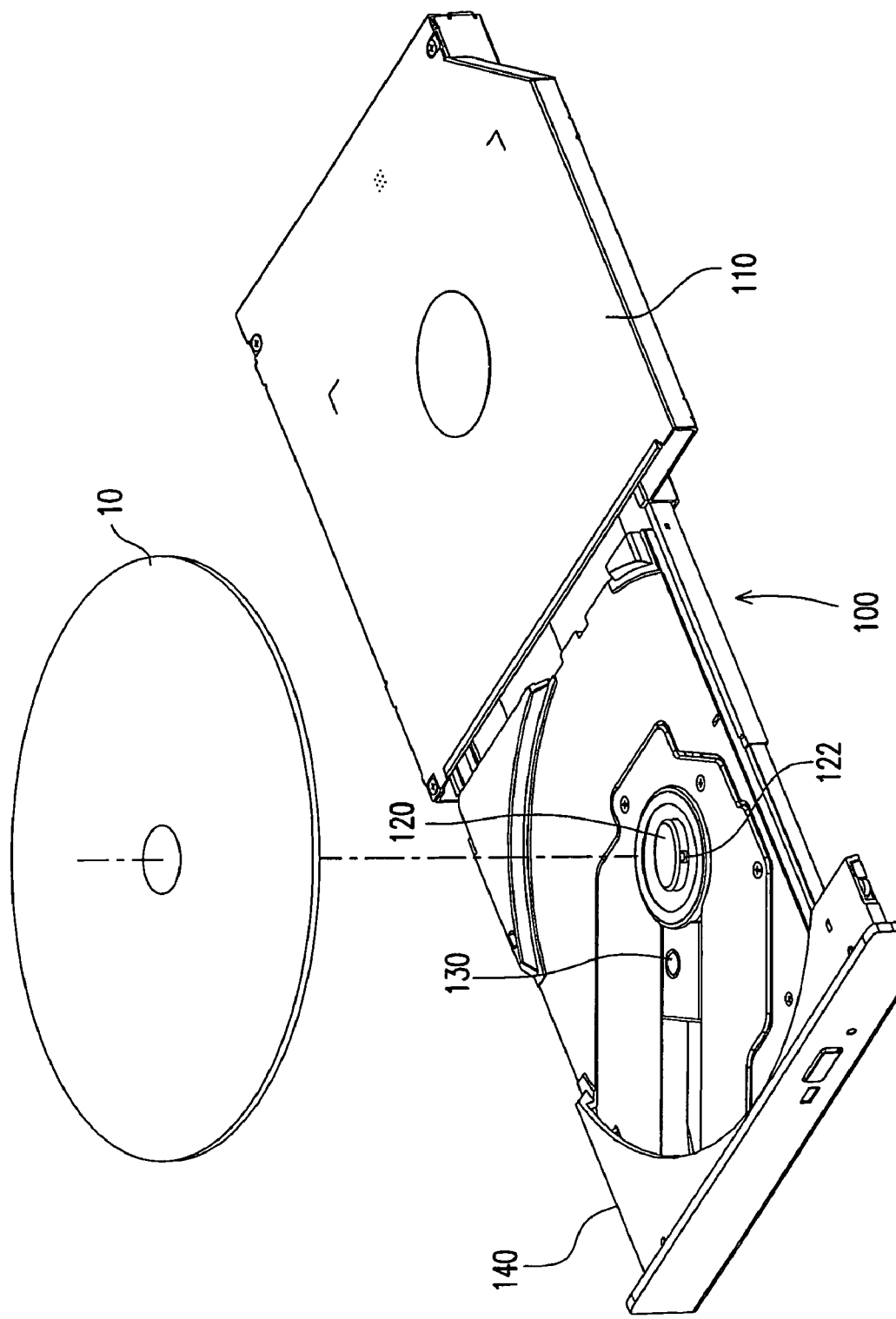
FIG. 1A is a three-dimensional schematic diagram showing a conventional optical disc drive and an optical disc.
Figure 1B:
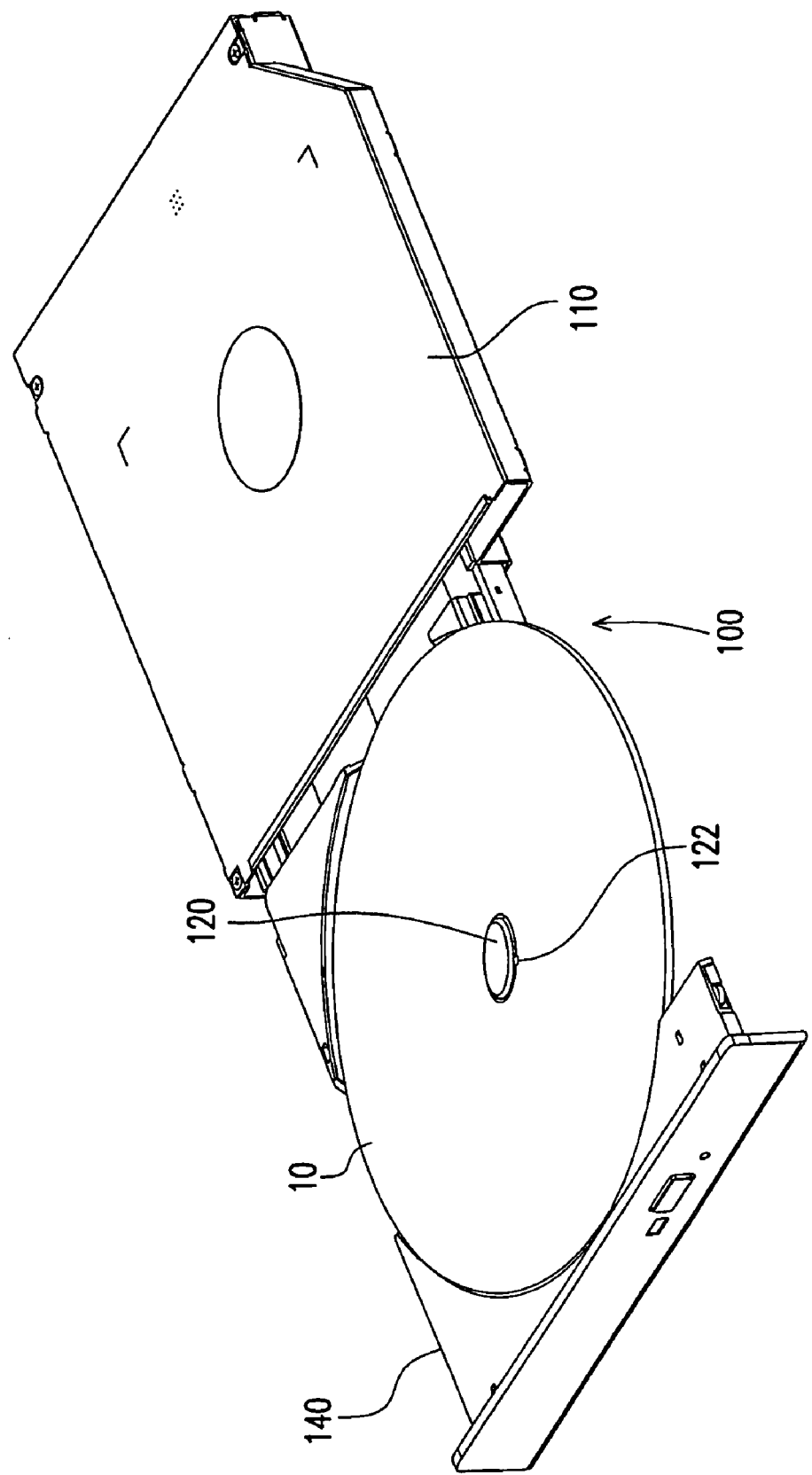
FIG. 1B is a schematic diagram showing the optical disc shown in FIG. 1A held in the turntable of the optical disc drive.
Figure 2A:
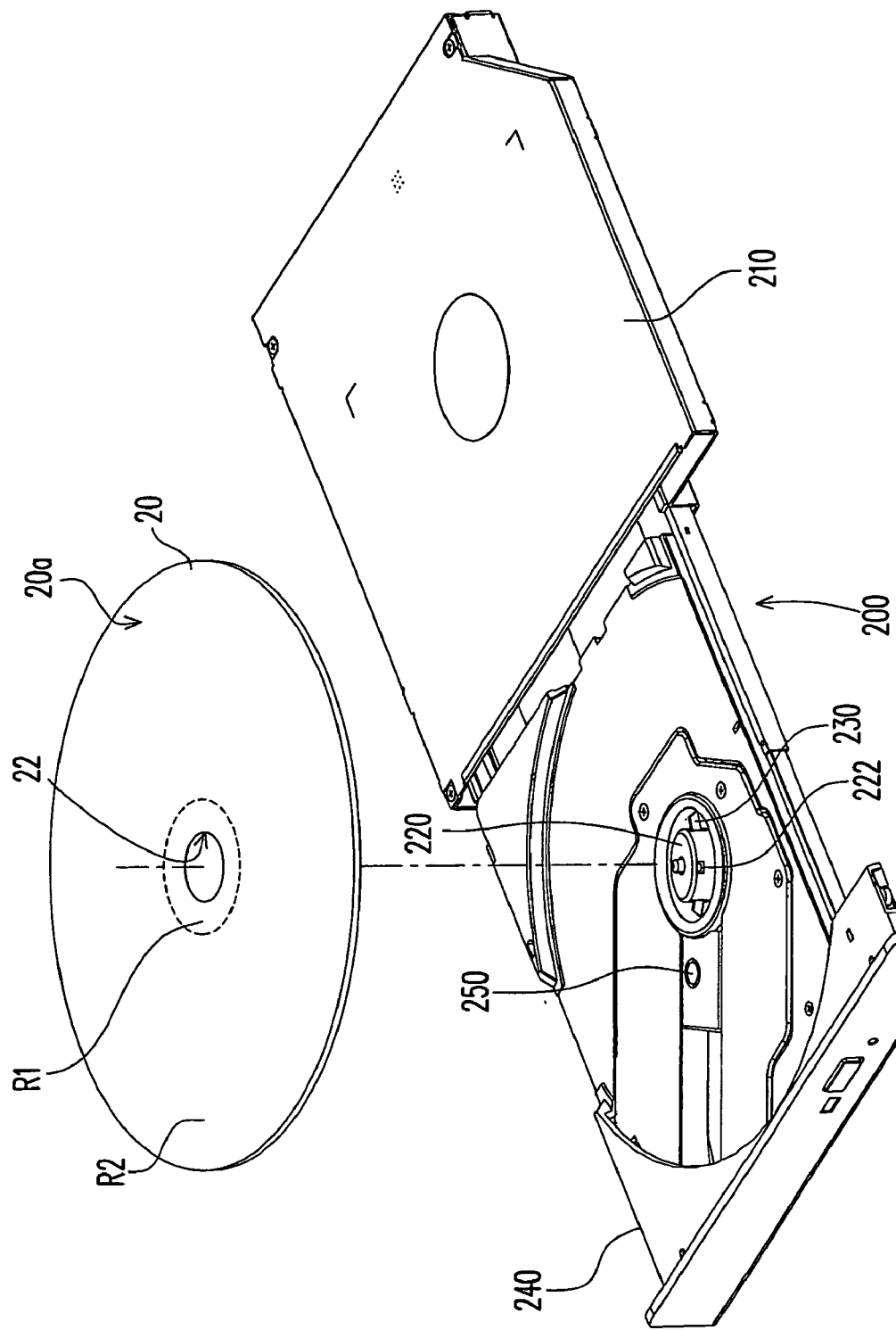
FIG. 2A is a three-dimensional schematic diagram showing an optical disc drive of one preferred embodiment of the invention and an optical disc.
Figure 2B:
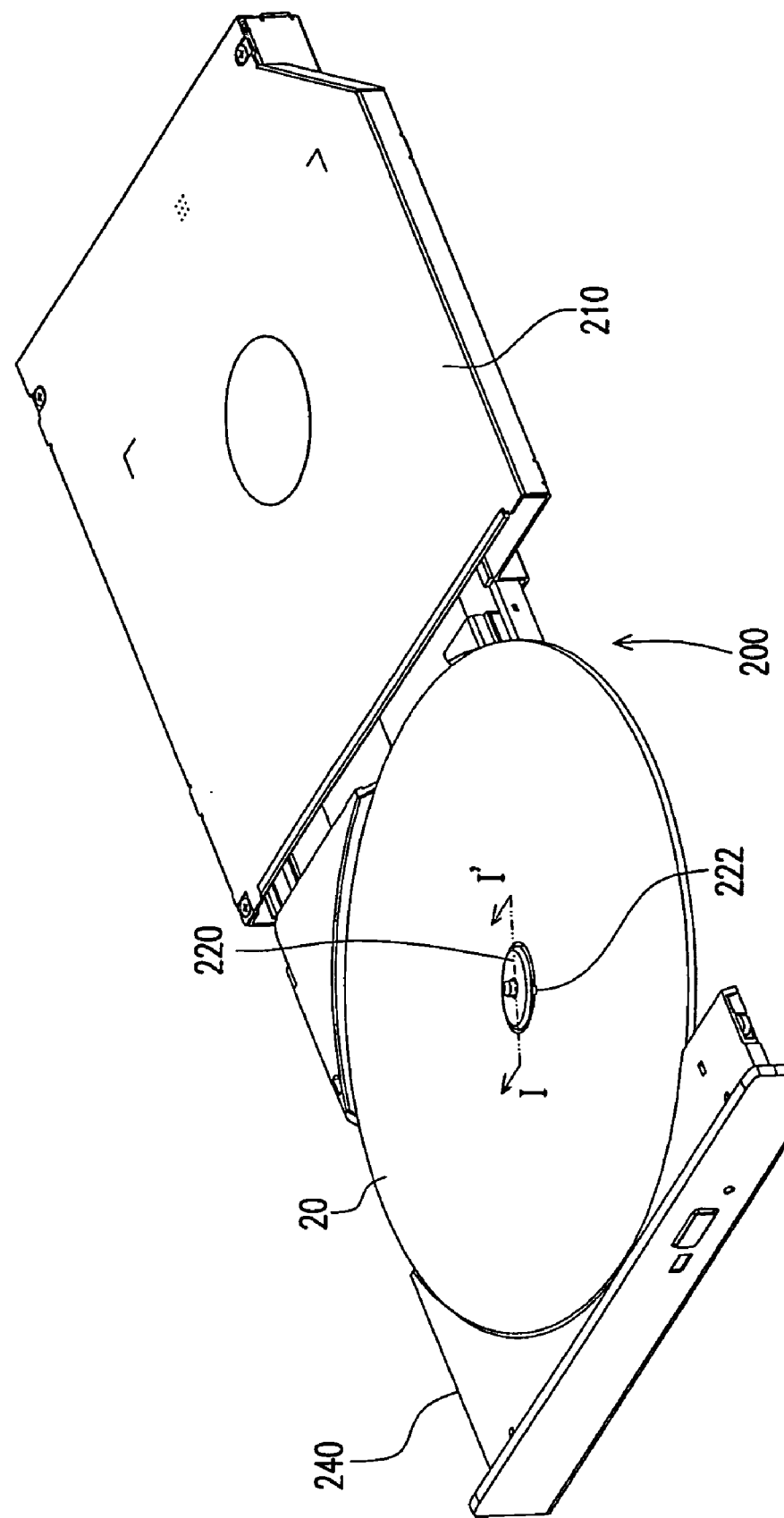
FIG. 2B is a three-dimension schematic diagram showing the optical disc shown in FIG. 2A held in the turntable of the optical disc drive.

FIG. 2A is a three-dimensional schematic diagram showing an optical disc drive of one preferred embodiment of the invention and an optical disc. FIG. 2B is a three-dimension schematic diagram showing the optical disc shown in FIG. 2A held in the turntable of the optical disc drive. Please refer to FIG. 2A and FIG. 2B simultaneously. The optical disc drive 200 of the embodiment is, for example, a slim optical disc drive for a notebook and suitable to read data of an optical disc 20. In the embodiment, the optical disc 20 has a non-data area R1 and a data area R2. The non-data area R1 is at the inner side of the optical disc 20 and surrounds a first opening 22, and the data area R2 is around the non-data area R1. The optical disc 20 is held on the optical disc drive 200 via the first opening 22.

From the above, the optical disc drive 200 of the embodiment mainly includes a housing 210, a turntable 220 and an ejecting mechanism 230 configured at the turntable 220. In addition, the optical disc drive 200 of the embodiment also can include a tray 240 and a pickup 250 for reading data of the optical disc 20. The tray 240 is configured in the housing 210 and suitable to eject from the housing 210 via a sliding track (which is not shown). The turntable 220 and the pickup 250 are, for example, configured on the tray 240. Moreover, a chuck claw 222 for holding the optical disc 20 is configured at the turntable 220 of the embodiment. Therefore, when a user puts the optical disc 20 at the tray 240, the optical disc 20 can be fixed on the turntable 220 via the chuck claw 222. Wherein, when the optical disc 20 is held at the turntable 220, the chuck claw 222 of the turntable 220 holds at the top surface 20a of the optical disc 20. In the embodiment, the turntable 220 is, for example, driven by a driving assembly 260, so that the pickup 250 can read the data of the optical disc 20 easily (Please refer to FIG. 3, which is a part cross-section diagram along I-I' line shown in FIG. 2B). The main structure of the optical disc drive 200 is described hereinbefore. The connecting relationship between the ejecting mechanism 230 and the turntable 220 is described in detail hereinbelow.

Figure 3:
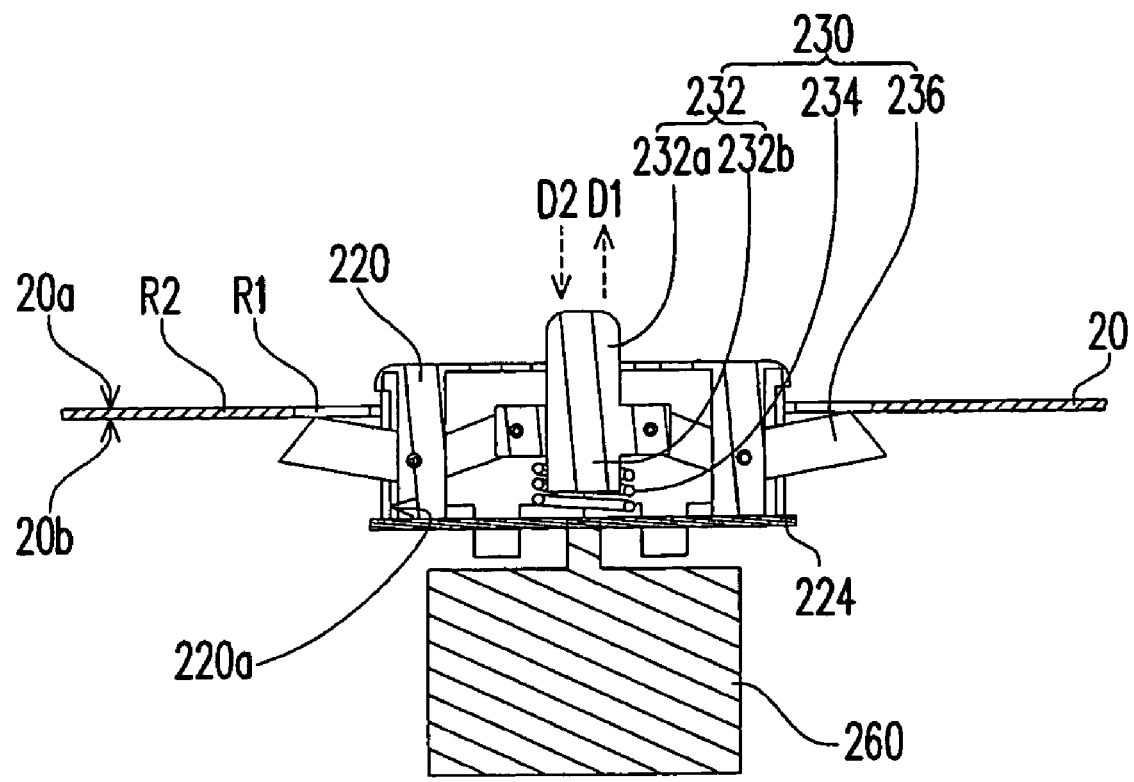
FIG. 3 is a part cross-section diagram along I-I' line shown in FIG. 2B.

Please continue to refer to FIG. 3. The ejecting mechanism 230 of the embodiment mainly includes a button 232 configured at the turntable 220, a reposition assembly 234 which is, for example, a spring and at least an ejecting assembly 236 (Two ejecting assemblys are drawn in FIG. 3.). In the embodiment, the reposition assembly 234 is adjacent to the button 232 and provides the button with a return force along a first direction D1. More detailedly, the reposition assembly 234 of the embodiment is configured between the button 232 and the base 224 of the turntable 220. Therefore, when a user presses the button 232 along a second direction D2 (Second direction D2 is opposite to the first direction D1.), the button 232 is forced and moves along the second direction D2 (The button 232, for example, is forced and moves downward.), and the reposition assembly 234 exerts a return force on the button 232 relatively to the base 224. When the user do not exert force on the button 232, the button 232 moves back to the initial position along the first direction D1 under the return force (The button 232 is, for example, pushed upward by the reposition assembly 234.). The base 224, for example, covers the second opening 220a of the turntable 220).

Figure 4A:
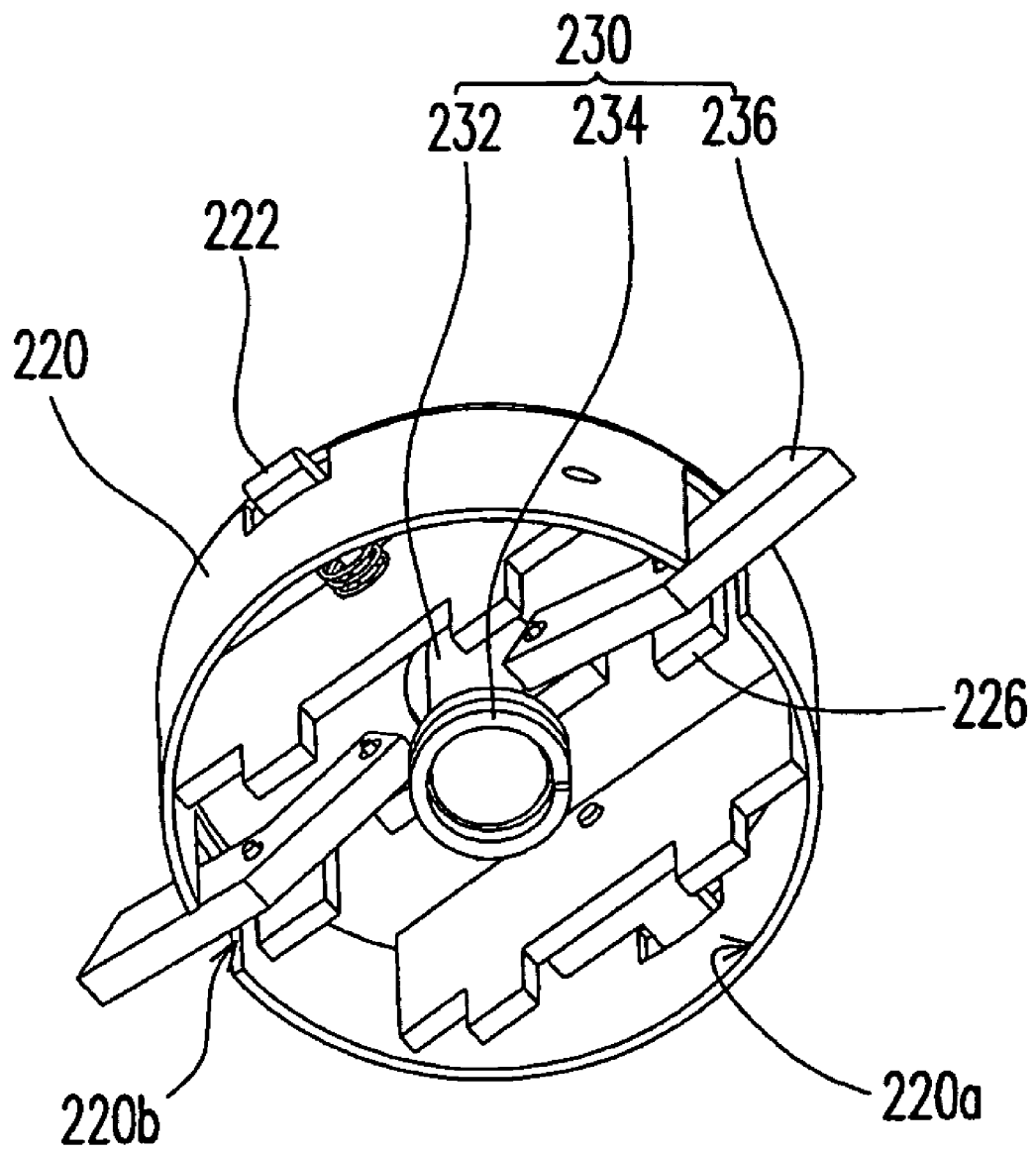
FIG. 4A is a three-dimensional schematic diagram showing the turntable and the ejecting mechanism shown in FIG. 2A in another angle of view.
Figure 4B:
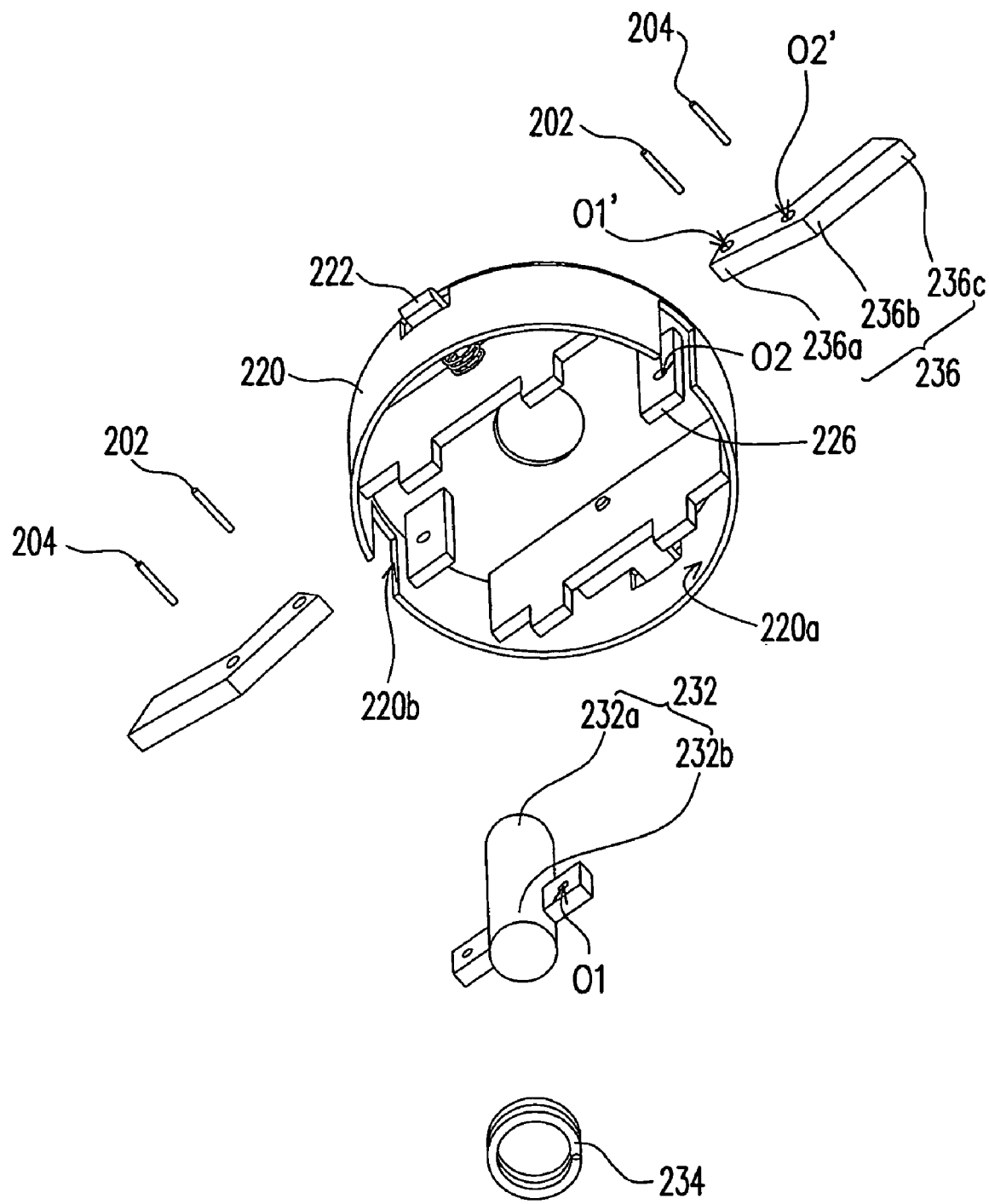
FIG. 4B is an exploded diagram showing the turntable and the ejecting mechanism shown in FIG. 4A.

Please refer to FIG. 3, FIG. 4A and FIG. 4B simultaneously. FIG. 4A is a three-dimensional schematic diagram showing the turntable and the ejecting mechanism shown in FIG. 2A in another angle of view. FIG. 4B is an exploded diagram showing the turntable and the ejecting mechanism shown in FIG. 4A. From FIG. 2, FIG. 4A and FIG. 4B, we can know that the button 232 is composed of an operating portion 232a and a connecting portion 232b, and the ejecting assembly 236 is, for example, wave-shaped and has a first portion 236a, a second portion 236b and a third portion 236c, wherein the second portion 236b is configured between the first portion 236a and the third portion 236c. The first portion 236a of the ejecting assembly 236 is, for example, pivotally connected to the connecting portion 232b of the button 232 by a first pivot 202. More detailedly, a pivot hole O1 is, for example, configured on the connecting portion 232b, and another pivot hole O1' which is relative to the pivot hole O1 is, for example, configured on the first portion 236a. The first pivot 202 can pass through the pivot hole O1 and pivot hole O1', so that the first portion 236a of the ejecting assembly 236 can be pivotally connected to the connecting portion 232b of the button 232. Similarly, the second portion 236b can be pivotally connected to at least a part of the turntable 220 by a second pivot 204. For example, a supporting portion 226 for supporting the ejecting assembly 236 can be connected at the turntable 220, wherein the supporting portion 226 has, for example, a pivot hole O2, and another pivot hole O2' which is relative to the pivot hole O2 can be connected at the second portion 236b of the ejecting assembly 236. The second pivot 204 can pass through the pivot hole O2 and the pivot hole O2'. In other words, the second portion 236b can be pivotally connected to the turntable 220 by the second pivot 204.

In addition, one or several third openings 220b are, for example, configured at one side of the turntable 220, and the third portion 236c of the ejecting assembly 236 protrudes from the third opening 220b of the turntable 220. The third portion 236c is suitable to block the bottom surface 20b of the optical disc 20. Wherein, the third portion 236c is, for example, against the non-data area R1 of the optical disc 20, so that the data stored in the optical disc 20 can be avoided being destroyed for the data area R2 is scraped. Therefore, when the operating portion 232a of the button 232 is forced and moves along a second direction D2, the connecting portion 232b of the button 232 can drive the third portion 236c of the ejecting assembly 236 to move along the first direction D1, and the third portion 236c which is against the bottom surface 20b of the optical disc can push the optical disc 20, so that the optical disc 20 can get rid of the holding of the chuck claw 222. In this way, the user can take off the optical disc 20 from the turntable 220 easily.

To sum up, an ejecting mechanism is configured on the turntable of the optical disc drive in the invention, so that when a user wants to take off an optical disc held on the turntable, he needs only press a button of the ejecting mechanism, and the button can drive an ejecting assembly of the ejecting mechanism to move along a first direction and push the optical disc, and then the optical disc can get rid of the holding of the chuck claw. In this way, the user need not worry about destroying the optical disc by the improper force when he takes off the optical disc from the turntable. That is, the user can takes off the optical disc from the optical disc drive swimmingly.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An optical disc drive suitable for reading data from an optical disc having a first opening, the optical disc drive comprising:
    a housing;
    a turntable configuring in the housing, the turntable having a chuck claw for holding the optical disc at the first opening;
    an ejecting mechanism configuring at the turntable, and the ejecting mechanism comprising:
    a button configuring at the turntable, the button having an operating portion and a connecting portion;
    a reposition assembly adjacent to the button and providing the button a return force along a first direction; and
    at least an ejecting assembly having a first portion connected to the connecting portion of the button, a second portion connecting to the turntable, and a third portion protruding out the turntable, wherein when the operating portion of the button is forced and moved along a second direction, the connecting portion drives the third portion to move along the first direction and push the optical disc.

2. The optical disc drive according to claim 1, wherein the optical disc drive further comprises a tray which is configured in the housing and suitable to eject from the housing, and the turntable is configured at the tray.

3. The optical disc drive according to claim 1, wherein the optical disc drive further comprises at least a first pivot and a second pivot, the first pivot disposes between the ejecting assembly and the connecting portion of the button, and the second pivot disposes between the ejecting assembly and at least a part of the turntable.

4. The optical disc drive according to claim 1, wherein the reposition assembly is a spring.

5. The optical disc drive according to claim 1, wherein the turntable further comprises a second opening and a base, the base covers the second opening, and the reposition assembly configures between the button and base.

6. The optical disc drive according to claim 1, wherein the optical disc drive comprises a driving assembly for driving the turntable.

7. The optical disc drive according to claim 1, wherein one side of the turntable further comprises at least a third opening, and the third portion of ejecting assembly passes through the third opening.

8. The optical disc drive according to claim 1, wherein the ejecting assembly is wave-shaped, and the second portion is between the first portion and the third portion.

9. The optical disc drive according to claim 1, wherein the optical disc drive is a slim optical disc drive suitable for a notebook.

10. The optical disc drive according to claim 1, wherein the button protrudes from one side of the turntable, and when the button is pressed down, the button moves toward the second direction, and when the button is pushed upward by the reposition assembly, the button moves toward the first direction.

* * * * *